United States Patent [19]

McAndrew

[11] 3,902,874
[45] Sept. 2, 1975

[54] VAPOR RECOVERY AND DISPOSAL SYSTEM

[75] Inventor: Murray A. McAndrew, Seabrook, Tex.

[73] Assignee: Shell Oil Company, Houston, Tex.

[22] Filed: Dec. 13, 1973

[21] Appl. No.: 424,396

[52] U.S. Cl. .................. 55/74; 55/161; 55/180; 55/387; 220/85 VR; 220/86 R
[51] Int. Cl.² .................................. B01D 53/04
[58] Field of Search ............... 55/18, 25, 26, 62, 74, 55/161, 179, 180, 387; 220/85 VR, 85 VS, 86 R

[56] References Cited
UNITED STATES PATENTS

| | | | |
|---|---|---|---|
| 3,289,711 | 12/1966 | Hall | 55/387 X |
| 3,352,294 | 11/1967 | Biller et al. | 55/387 X |
| 3,393,669 | 7/1968 | Vardi et al. | 55/387 X |
| 3,543,484 | 12/1970 | Davis | 55/387 |
| 3,713,273 | 1/1973 | Coffee | 55/74 X |

Primary Examiner—Samih N. Zaharna
Assistant Examiner—Richard W. Burks

[57] ABSTRACT

A system is disclosed for preventing gasoline vapors contained in air vented from gasoline storage tanks from entering the atmosphere, which includes a conduit to pass gasoline-laden air to a bed of adsorbent for gasoline and, when the adsorbent approaches saturation, subjecting it to backwashing with air, preferably heated, from a blower to an extent and for a time adequate to remove enough gasoline from the adsorbent to restore it to a regenerated condition, and combusting the gasoline removed from the adsorbent bed in an internal combustion engine. It is also disclosed to drive the blower with the internal combustion engine and to utilize waste heat from the engine to heat the air by passing it through a radiator associated with the internal combustion engine.

5 Claims, 1 Drawing Figure

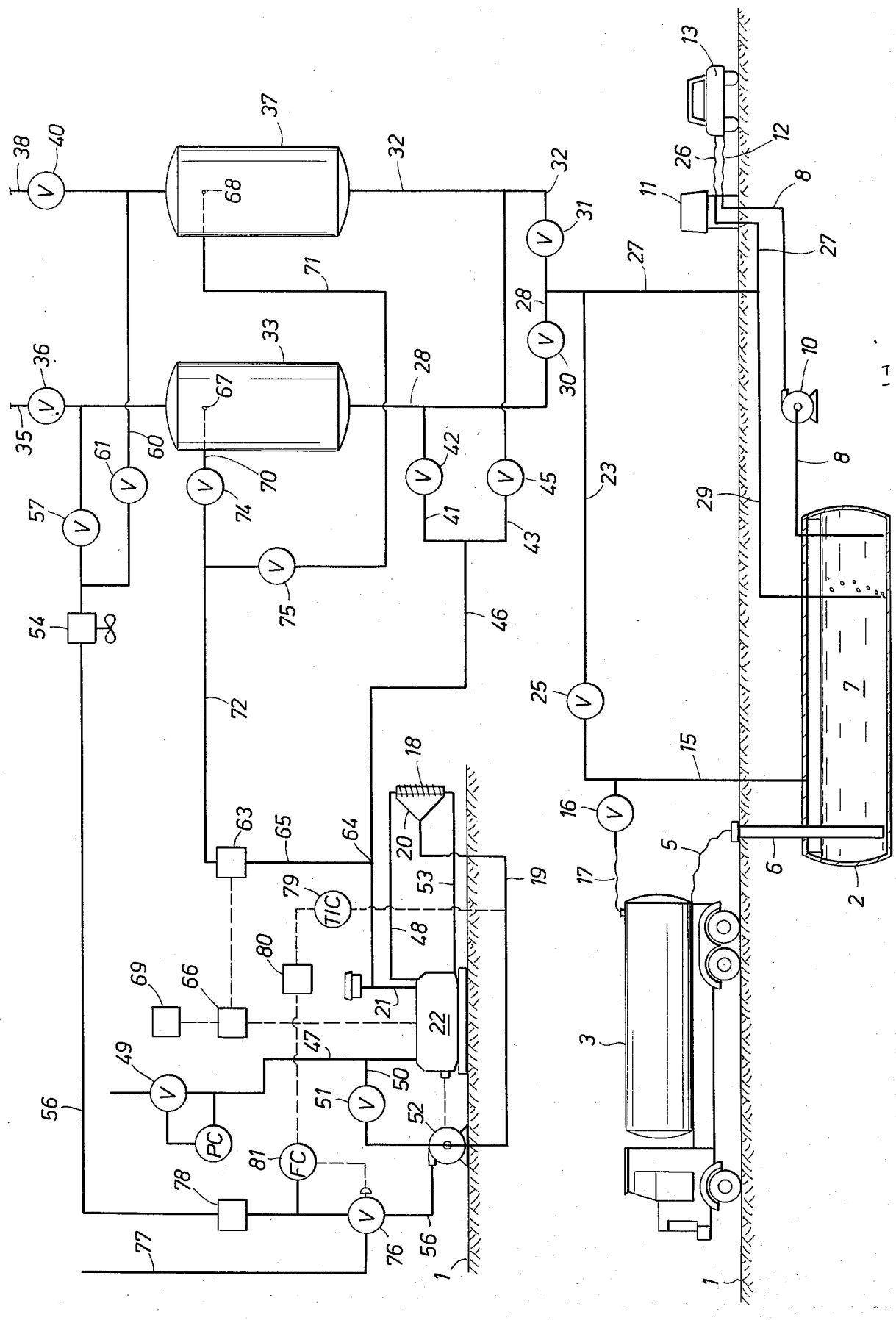

VAPOR RECOVERY AND DISPOSAL SYSTEM

BACKGROUND OF THE INVENTION

A source of air pollution is the gasoline vapor in air vented from storage tanks for gasoline when those tanks are filled. Storage tanks, such as the underground storage tanks in filling stations and the fuel tanks in automobiles, draw air in as the volume of liquid is gradually depleted. Long contact with the liquid causes the air in the tank to become saturated with, or at least very enriched with, gasoline vapors. When liquid is added to the tank to replenish the supply, a volume of gasoline vapor-rich air essentially equal to the volume of liquid added is displaced and vented to the atmosphere unless some means for removing the gasoline vapor from the air is employed.

THE INVENTION

The present invention provides an effective and inexpensive system to avoid gasoline vapor loss to the atmosphere when storage tanks for gasoline are filled. The invention is a system for recovering gasoline vapors which includes a bed of solid adsorbent that is capable to adsorbing gasoline vapors from a mixture of gasoline vapors with air. The vapor-laden air passes through the bed before being vented to the atmosphere. As consequence, air vented to the atmosphere via the adsorbent bed is substantially free of gasoline vapor, thereby avoiding atmospheric pollution.

The invention also includes means for backwashing the adsorbent bed to desorb gasoline from the adsorbent when the capacity of the bed for adsorbing gasoline vapors is approached. In accordance with the invention, the desorbed vapors are combusted in an internal combustion engine to form non-polluting materials such as carbon dioxide and water vapor.

Within the broad scope of this invention, there are many preferred embodiments and operating procedures. One preferred embodiment is to employ a system wherein vapor volumes are exchanged between various vessels so that only excesses need be passed through the adsorbent bed, whereby the capacity of the adsorbent bed and the accompanying system can be greatly diminished; or, alternatively, the time between regenerations may be greatly extended. For example, when a filling station storage tank is to be filled from the tank of a delivery truck, the volume of liquid added to the storage tank is substantially the same as the volume of liquid removed from the truck. Consequently the amount of vapor-laden air vented from the storage tank will be substantially the same as the volume of air vented into the tank of the delivery truck. In a preferred embodiment of this invention, during loading of the storage tank, the vapor spaces of the tank on the truck and the storage tank will be connected, and both will be connected either directly or indirectly to the adsorbent bed or to a storage vessel for gasoline vapor-rich air. In such a system only the small difference in gas volume caused by factors such as temperature or pressure differences between the two vapor spaces will be passed through the adsorbent bed or to the volume for storing saturated or vapor-rich air, thereby greatly diminishing the volume of gasoline-laden air that must be treated by the adsorbent bed or that must be stored in the storage vessel for vapor-rich air.

A slightly modified version of the same technique may be used to exchange vapor volumes between a filling station storage tank and the fuel tank of a vehicle. In such a system the vapor volume exchange will be effected by connecting the vapor space of the vehicle fuel tank and the vapor space of the storage tank during the period when fuel is removed from the storage tank and added to the vehicle tank if the systems are sufficiently sealed so that these volumes may be exchanged without the addition of outside air. Again, in such a system a substantially equal volume of vapor is exchanged and only the slight volume difference, due to factors such as thermal expansion or small pressure variations, will pass through the adsorbent bed or to a vessel for storing vapor-rich air. The above-described volume exchange systems relate to ideal systems where the various vessels and the conduits interconnecting them are completely enclosed, and such systems are referred to hereinafter as closed systems.

When systems are used in which outside air enters the various flow streams, this invention is still effective although it may be necessary to accommodate a greater volume of air. Systems in which small amounts of air are induced into the various flow streams, for example by the Venturi effect of a liquid stream passing through a nozzle where a completely tight connection is not made, may also be employed with this invention. Such systems are referred to hereinafter as tight systems. In tight systems equal or substantially equal volume exchanges of air between storage tanks will never be made because some volume of air will always be added to the gas volumes being exchanged. In tight systems the adsorbent beds will generally have to deal with the significant volume of gasoline vapro-laden air, and greater amounts of adsorbent, more frequently regeneration or more through regeneration of the adsorbent may be necessary. In adapting this invention to a tight system, the vapor spaces of the various vessels may be interconnected but conduits must be made available to carry excess vapor to the adsorption bed.

The present invention is also useful in systems in which large amounts of air are forced into the various streams. These systems are hereinafter referred to as open systems. An example of an open system is one in which the gasoline vapor-laden air escaping from a fuel tank as it is being filled is prevented from escaping to the atmosphere by being induced into a collection system. For example, the nozzle for filling a vehicle fuel tank may be provided with a hood that has a partial vacuum induced by a blower connected to it so that all of the air vented from the fuel tank, as well as some extraneous air, will pass into the vapor recovery system thereby preventing gasoline vapors from entering the atmosphere. In such systems the air drawm into the system may constitute more than 97% of the gas phase to be dealt with; and, accordingly, substantially larger amounts of adsorbent or more frequent regeneration intervals may be needed.

Whether the system for collecting vapors is open, tight or closed, or whether the system involves volume exchange or not, eventually at least some gasoline vapor-laden air to be vented passes through the bed of adsorbent wherein substantially all of the gasoline is removed from it, and air substantially free of gasoline is passed to the atmosphere. Before the adsorbent is saturated and before a significant amount of gasoline vapor breaks through the bed, the adsorbent must be regenerated. Most adsorbents use only a small percentage of their total capacity when employed in the present invention. For example, if an adsorbent is used until it is completely saturated, too much gasoline vapor will break through the bed and enter the atmosphere. On the other hand, completely regenerating the adsorbent so that all gasoline is gone from it is a very difficult and costly process and one that will not normally be done. The adsorbent beds employed in this invention will normally operate over that portion of their capacity between the point where gasoline vapors break through the bed and the point of desorption that can be achieved by simple backwashing of the bed with air or engine exhaust gas, with or without the application of a moderate amount of heat.

In accordance with the invention, reganeration is effected by backwashing the adsorbent bed with a readily available gas such as compressed air from a blower to remove gasoline from the adsorbent bed by vaporizing it into the backwash gas. The vapor-containing backwash gas is then passed to an internal combustion engine where it is combusted and the gasoline contained therein is converted essentially to innocuous carbon dioxide and water. Preferably the internal combustion engine will also be used to drive the blower. The backwashing is continued for a time sufficient to produce a regenerated adsorbent, that is, an adsorbent that is capable of adsorbing additional gasoline vapors when vapor-laden air is passed through it again in the adsorption mode. It is within the scope of this invention to provide heat to the adsorbent bed to hasten and aid the regenerating process. A convenient source is the waste heat from the engine. The heat may be obtained by passing air through a radiator associated with the internal combustion engine before compressing it with the blower.

Under certain conditions of temperature and hydrocarbon concentration on the adsorbent, which may include at least part of the normal operating range of the proposed vapor recovery system, the flash point of the vapor-air mixture in equilibrium with the eluting bed may be reached. See, for example, F. E. Woods and J. E. Johnson. "The Ignition and Combustion Properties of Activated Carbon Containing Adsorbed Hydrocarbons," U.S. Naval Research Laboratory Rpt. 6090, July 28, 1964. A simple means by which to avoid ignition of the hydrocarbon during elution of the adsorbent bed would be to use instead of air an oxygen-deficient eluting gas; specifically, a portion of the exhaust gas from the engine which is oxygen-deficient relative to air, and which also contains heat to supply the needed heat of desorption of hydrocarbon from the adsorbent. The exhaust gas from the engine might advantageously be cooled somewhat, for example by exchange with ambient air, in order to provide only sufficient heat for a controlled rate of desorption of hydrocarbon vapor from the adsorbent.

The regeneration of an adsorbent bed usually will be accomplished very quickly compared to the time it spends adsorbing vapors. Regeneration can be terminated automatically by stopping the flow of backwash gas to the adsorbent bed by stopping the internal combustion engine when the backwash gas contains insufficient gasoline to support combustion. Thus, when all vapor-rich air has been exhausted and the adsorbent bed has been backwashed to the point where a combustible mixture of backwash gas can no longer be maintained, relatively simple automatic equipment may be employed to terminate the regeneration period. When measures are taken to insure a sufficient amount of gasoline vapor-rich air has been removed to complete the regeneration, regeneration may be terminated automatically after a predetermined time period has elapsed. By regulating the time of the adsorption cycle by such factors as the volume of gas treated and by regulating the time of the regeneration cycle by such factors as the absence of a combustible mixture or the elapse of the predetermined time, sophisticated instruments for sensing hydrocarbons in flowing streams may be avoided.

The system of this invention must be operative at all times when liquid is being transferred from one storage tank to another. In a preferred system, two adsorbent beds are employed: one adsorbs gasoline vapors while the other is being regenerated.

THe accompanying drawing is a highly schematic representation of a system embodying this invention, and it is provided to show the various functions that will be employed without regard to scale. The lines 1 in the drawing represent grade below which is buried a filling station storage tank 2. There is also illustrated a tank delivery truck 3 provided with a liquid delivery hose 5 for delivering liquid gasoline through a suitable conduit 6 to join the volume of gasoline 7 maintained in the tank 2. There is also illustrated a conduit 8 for delivering gasoline through a pump 10 and a filling station island 11 for delivery through a hose 12 to an automobile or other vehicle 13. The equipment thus far described is the conventional equipment that already exists in virtually every filling station or is periodically associated with every filling station.

In accordance with the present invention, the vapor space in the storage tank 2 may be connected via pipe 15, valve 16 and conduit 17 to the vapor space in the tank on delivery truck 3. Accordingly, when liquid is delivered from delivery truck 3 to storage tank 2, if valve 16 is open the vapor-laden air in the vapor space of vessel 2 passes through line 15 and is drawn into the tank of truck 3 via line 17 as the level of liquid in the tank of the truck 3 diminishes. Any excess vapor-laden air from the vapor space of tank 2 passes on through line 15 to one or another of the vapor recovery systems to be described hereinafter. The lines 5, 15 and 17 constitute a closed or a tight system, and the vapor-laden air passing through line 15 will be substantially saturated with gasoline vapors.

When the volume exchange system is not employed, valve 16 may be closed and the vapor-laden air from tank 2 may be passed through valve 25 and line 23. When valve 25 is open, the vapor-laden air passing through line 23 has the vapor removed therefrom as will be described in more detail hereinafter.

When filling a vehicle fuel tank, a means will be provided for collecting the vapor-laden air expelled from the vehicle storage tank, which means is not shown herein, and the collected vapor-laden air is passed through flexible hose 26 and into line 27. The material in line 27 can be passed through one of several alternative routes. If a closed system or a tight system exists between tank 2 and vehicle 13, the vapor-laden air is passed through line 27 and line 29 and is introduced beneath the surface of the gasoline in tank 2. This volume exchange provides for vapor-rich air to enter tank 2 rather than ordinary air, and it thereby avoids gasoline losses by introducing most of the air vented from the vehicle tank into the underground storage tank.

The vapor-laden air introduced into tank 2 through line 29 is saturated as it bubbles through the gasoline to avoid formation of explosive mixtures in tank 2 and disposed of via line 15. Alternative methods for saturating this vapor-laden air may be employed.

If an open system exists between vehicle 13 and line 27, it will not be economical to use line 29 and volume exchange because too much gasoline would be consumed saturating the excessive amounts of air drawn into the system. In such case, the vapor-laden air drawn from the fuel tank of vehicle 13 is passed through line 27 and then either through line 28 to the adsorbent bed in vessel 33 or through line 32 and the adsorbent bed in vessel 37. Valves 30 and 31 will be opened and closed appropriately so that one or the other of vessels 33 or 37 will be in use. In passing through the bed of adsorbent, the gasoline vapors are removed from the air, and vapor-free air passes through the vent to the atmosphere. When the vessel 33 is in the adsorption mode, valve 31 in line 32 will be closed to prevent the flow of vapor-laden air therethrough. However, when the adsorbent bed in vessel 33 becomes sufficiently saturated with gasoline to be regenerated, the valve 30 will be closed and the valve 31 will be opened so that vapor-laden air may pass through line 32 and into vessel 37 which also contains a bed of adsorbent for gasoline vapors. The resultant gasoline-free air is vented through vent 38 and valve 40 to the atmosphere. When desired, the vapor-saturated air passing through line 15 and line 23 may also be passed to one or the other of the adsorbent beds contained vessel vesses 33 or 37.

For the sake of illustration, it will be presumed that the adsorbent bed in vessel 33 is in the adsorption mode and the adsorbent bed in vessel 37 has been regenerated. When sufficient gasoline has been adsorbed in the bed vessel 33 so that regeneration of that bed is appropriate, valves 30, 36 and 61 will be closed and valves 31, 38 and 58 will be opened. At that point valve 42 in line 41 will be opened, valve 45 in line 43 will be closed, and the internal combustion engine 22 will be placed in operation so that a flow of air passes through lines 56 and 57 to backwash the adsorbent bed in vessel 33 with air, through line 28 and line 41 into line 46 to the air or fuel intake line 21 of engine 22, and ultimately into line 47 which discharges to the atmosphere through pressure control value 49, or alternatively, through line 50 and valve 51 into the suction of blower 52, which is preferably driven by engine 22, where it is recycled to the adsorbent bed 33 via line 56 and line 57.

In a preferred embodiment of the invention air to blower 52 is heated by passing it over radiator 18 which may be a part of a water cooling system for engine 22. Radiator 18 is connected to circulating cooling water for engine 22 via lines 48 and 53. Air is drawn through radiator 18, which is surrounded by a cowling 20, and into line 19 which is connected to the gas intake of blower 52. Thus heat from the engine is used to speed regeneration of the adsorbent bed. A constant flow of gas from blower 52 to the adsorbent bed being regenerated can be maintained by flow control valve 76 located in line 56 whereby excess gas can be routed to atmosphere via line 77. It may be advantageous to use air at a certain minimum temperature in which case temperature controller 79 is used, via switch 80, in cascaded operation with flow controlled 81. Thus, when the temperature of the air in line 19 is below the minimum value (engine cold), the air is vented to atmosphere via valve 76 and line 77. When the temperature reaches the minimum value, flow controller 81 opens valve 76 in such a manner as to allow the required flow of heated air to pass into line 56 and thence to the adsorbed bed being regenerated. Preferably any solid particles contained in the gas from blower 52 will be removed by a suitable filter 78 located in line 56.

When the adsorbent in vessel 37 approaches saturation, regeneration in the vessel is effected by closing valves 31, 40, 42 and 58 while valves 30, 36, 45 and 61 are opened so that air backwashes the bed in vessel 37, desorbing the gasoline from the bed and regenerating it. The backwash air passes through line 32, line 43, line 46 and line 21, through the engine 22 so that the gasoline vapors are disposed of as harmless $CO_2$ and $H_2O$.

Still another embodiment of the invention to increase the capacity of the adsorbent beds between successive regenerations is the use of part of the hot exhaust gas from engine 22 which is passed through line 50 and valve 51, mixed with warm air from line 19, thence into blower 52 where it is compressed and passed via line 56 into one or another of the adsorbent beds so that high temperature desorption may be effected. Thus, if the adsorbent in vessel 37 is being regenerated, the valve 40 may be closed and the valve 61 opened so that hot exhaust gas passes from line 56 through line 60 and backwashes the adsorbent so that the higher-temperature desorbing gas will remove greater quantities of gasoline. If desired the hot gas can be cooled somewhat, e.g., by heat exchange with ambient air in cooler 54, to provide only sufficient heat for a controlled rate of desorption of gasoline vapor from the adsorbent. The hot gas is then circulated back into engine 22 through line 32, 43, 46 and 21 where any gasoline vapors stripped from the adsorbent bed in vessel 37 are combusted. Of course, when vessel 33 contains the bed being regenerated, then the valve 36 will be closed and the valve 58 opened so that hot gases can pass through line 57 to backwash the adsorbent bed therein.

It is also an embodiment within the scope of this invention to operate the engine 22 when storage tank 2 is being filled to dispose of some of the vapor issuing from it while the rest is taken care of in one or the other of the adsorbent beds in vessels 33 and 37. In this embodiment, during the loading of the storage tank 2 any excess vapor expelled from it passes through line 15, line 23, line 27 and one or the other of the lines leading to vessel 33 or 37. For purposes of illustration, vessel 33 will be employed to adsorb the excess vapors and vessel 37 will be isolated by closing valves 31, 40, 45 and 61. In this embodiment valves 30, 36 and 42 are opened and the engine 22 is operated with exhaust gases vented through line 47 and air from blower 52 vented through line 77. In this embodiment the vapor-saturated air is drawn into the engine 22 to be disposed of by combustion. Any excess vapor-laden air that is beyond the capacity of the engine 22 to handle simply passes through line 28 into the vessel 33 wherein the gasoline is removed from the air and pollutant-free air is discharged through the vent 35. With vessel 33 left in the adsorption mode, the engine 22 may be turned off when storage tank 2 is filled, or, with vessel 33 in the regeneration mode and vessel 37 in the adsorption mode, it may remain in operation until the adsorbent in vessel 33 is regenerated as indicated by insufficient gasoline in the vapor-air mixture passing through line 46 to support combustion.

One suitable control for regeneration includes a control center 63 having suitable conventional means to receive impulses characteristic of specific conditions and to produce a suitable control impulse in response thereto. As shown herein, the control center 63 is connected via line 65 to a suitable sensing means 64 that is capable of sensing when insufficient gasoline to support combustion remains in line 46. A signal from the control center to switch 66 shuts down engine 22. The engine may also be shutdown by a timer 69 which is connected to switch 66.

THe engine 22 can be started automatically by control center 63 which may be connected to suitable sensing means 67 and 68, located in the adsorbent beds contained in vessels 33 and 37, which are capable of sensing gasoline vapors in the bed being used as an adsorbent. The signal travels through either lines 70 or 71, through line 72 to control center 63, which operates switch 66. Valves 74 and 75 are opened or closed as required to monitor the vessel being used to adsorb gasoline vapors.

The solid adsorbents for use in this invention may be any of those known to the art which are capable of adsorbing gasoline vapors from a mixture of gasoline vapors and air. Examples of suitable adsorbents are activated charcoal, silica gel and certain forms of porous minerals such as alumina, magnesia, etc. which are known to selectively adsorb gasoline vapors from air.

What is claimed is:

1. A system to recover gasoline from gasoline vapor-laden air that is vented while filling a first gasoline storage tank from the gasoline contained in a second gasoline tank comprising:
   A. a conduit for delivering liquid from the second storage tank to the first storage tank;
   B. a conduit connecting the vapor spaces of the first and second storage tanks;
   C. at least one vessel containing a bed of solid adsorbent capable of selectively adsorbing gasoline from said vapor-laden air;
   D. a valved vent to the atmosphere from said vessel;
   E. a valved inlet into said vessel on the other side of said bed from said vent, said inlet connected to said conduit connecting the vapor spaces of the first and second storage tanks;
   F. a valved conduit from said adsorbent bed-containing vessel connecting the inlet side of said bed to the air or fuel intake of an internal combustion engine;
   G. a blower driven by said engine for passing backwash gas through said bed and discharging it in said engine;
   H. means for combusting said backwash gas in said engine; and
   I. means for heating said bed of solid adsorbent with waste heat from said engine, including a radiator associated with said engine for heating said backwash gas before passing same to said vessel containing said adsorbent bed.

2. The system of claim 1 wherein means are provided for cooling said heated backwash gas before passing it to said vessel containing said adsorbent bed.

3. The system of claim 1 wherein means are provided for starting said engine when said adsorbent bed is nearly saturated with gasoline vapors and means for stopping said engine when said backwash gas contains insufficient gasoline to support combustion, indicating said bed has been regenerated.

4. A process for recovering gasoline vapor from vapor-laden air expelled from a tank while filling it with gasoline, comprising:
   A. collecting said vapors;
   B. passing at least some of said vapors through a bed of solid adsorbent capable of selectively adsorbing gasoline from the vapor-laden air;
   C. passing air substantially free of gasoline vapors from the other side of said bed of adsorbent to the atmosphere;
   D. stopping the flow of vapor-laden air through said bed before said adsorbent becomes saturated with gasoline;
   E. subsequently backwashing said bed with a heated backwash gas comprising compressed air from a blower driven by an internal combustion engine for a period long enough to desorb enough gasoline to regenerate said bed, said backwash gas being heated by passing it through a radiator associated with said engine;
   F. passing backwash gas to the air or fuel intake of said engine wherein the gasoline contained in said backwash gas is burned.

5. The process of claim 4 wherein the heated backwash gas is cooled to provide only sufficient heat for a controlled rate of desorption of gasoline vapor from said bed of adsorbent.

* * * * *